Figure 1:
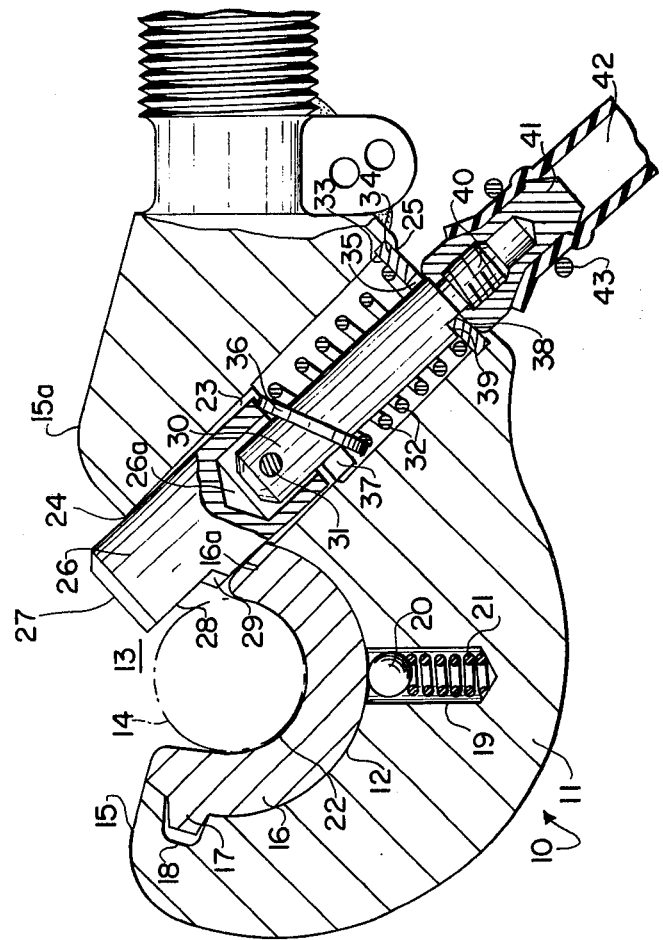

United States Patent [19]

Geisthoff et al.

[11] 4,023,822
[45] May 17, 1977

[54] COUPLING HOOK FOR A GUIDE MEMBER OF A TRACTOR THREE-POINT ATTACHMENT

[75] Inventors: Hubert Geisthoff; Clemens Nienhaus, both of Lohmar, Germany

[73] Assignee: Jean Walterscheid GmbH, Lohmar, Rhineland, Germany

[22] Filed: Apr. 29, 1976

[21] Appl. No.: 681,710

[30] Foreign Application Priority Data

Feb. 28, 1976 Germany .......................... 2608276

[52] U.S. Cl. .............................................. 280/508
[51] Int. Cl.² .......................................... B60D 1/10
[58] Field of Search ...... 280/508, 509, 504, 456 A, 280/460 A, 461 A

[56] References Cited

UNITED STATES PATENTS

| | | | |
|---|---|---|---|
| 2,842,380 | 7/1958 | Weiss | 280/504 |
| 3,361,477 | 1/1968 | Engelmann | 280/504 |
| 3,437,355 | 4/1969 | Jeffes | 280/504 |
| 3,539,203 | 11/1970 | Bough | 280/504 |

Primary Examiner—Robert R. Song
Attorney, Agent, or Firm—Edmund M. Jaskiewicz

[57] ABSTRACT

A coupling hook has a latch bolt slidable in a bore in the hook so as to be displaceable into the hook opening. A locking bolt is pivotally attached to the latch bolt and is acted upon by a locking spring in a direction so as to intersect the axis of the locking bolt and the bore. The locking bolt has a locking surface which under the force of the locking spring is engaged with an abutment surface when the latch bolt is in the locked position.

7 Claims, 2 Drawing Figures

COUPLING HOOK FOR A GUIDE MEMBER OF A TRACTOR THREE-POINT ATTACHMENT

The present invention relates to a coupling hook for a guide member of a tractor three-point attachment, more particularly, to such a coupling hook adapted for the upper guide member and having a latch which can be secured in the locked position to retain a coupling pin within the hook.

The guide members for tractor attachments to which implements are to be connected had been provided with a wide variety of coupling hooks many of which have been provided with different forms of locking or latching structures to retain implement coupling pins therein. In German Pat. No. 1,255,376 there is disclosed an upper guide member having a coupling hook thereon with a locking bolt which is retained in the locked position by a spring and can be opened by means of a handle actuated from the driver's seat. The same handle can also be operated to unlock the extension of the upper guide member. This structure has the disadvantage that under working conditions various forces are produced on the implement coupling pin through vibration and rotary movements and these forces may lead to an undesirable opening of the coupling hook lock upon overcoming of the locking spring.

In the German Pat. No. 1,263,380 there is disclosed a coupling hook having a locking member secured against accidental opening under working conditions by means of a spring loaded angular lever and recesses in the angular lever and the locking member. However, this structure is particularly suitable for the coupling hooks of lower guide members wherein the coupling hook openings are directed upwardly. When such a device is employed on an upper guide member which is preferably provided with a downwardly oriented coupling hook opening, additional functional components would be required in order to transmit the operating forces which originate from above from the driver's seat so that the angular lever can be moved downardly into the locked position. This necessary additional structure would result in a coupling hook for an upper guide member having such a large size and bulk so as to be unsuitable for use on the tractor hitch. Therefore, the use of such a locking structure for an upper guide member was not satisfactory since this structure was not feasible both economically and structurally.

It is therefore the principal object of the present invention to provide a novel and improved coupling hook which is particularly adapted for the upper guide member of a tractor three-point hitch.

It is another object of the present invention to provide such a coupling hook having a simple but effective safety device for the coupling hook lock which precludes accidental release from any movement of the coupling pin.

It is a further object of the present invention to provide such a coupling hook having a locking device in which unintentional unlocking is prevented.

According to one aspect of the present invention a coupling hook for a guide member of a three-point attachment on a tractor may comprise a hook member having an opening to receive a coupling pin on an implement to be coupled. The hook member is provided with a bore which opens into the hook opening and a latch bolt is within the bore so as to be displaceable into the hook opening in the locked position. A locking bolt is in the bore and is pivotally connected to the latch bolt. The locking bolt has a locking surface thereon and a spring acts upon the locking bolt in a direction intersecting the axis of the locking bolt. The locking surface on the locking bolt is engagable with abutment means under the action of the spring to retain the latch bolt in the locked position.

The coupling hook of the present invention has the advantage that its latch cannot be accidentally opened through any movement of the implement coupling pin in the coupling hook. This result is achieved by locking of the locking bolt by means of a disc having an abutment thereon and this disc is not affected in any manner by any actions or movements of the implement coupling pin on the latch of the coupling hook.

Figure 2:
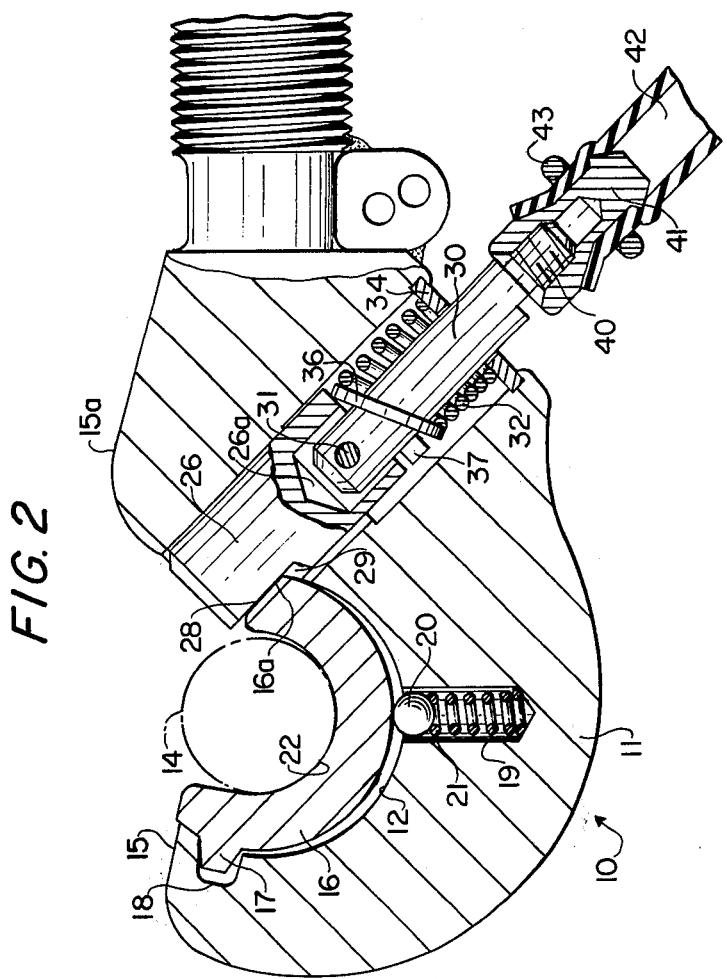

Other objects and advantages of the present invention will be apparent from the accompanying description when taken in conjunction with the following drawings, which are exemplary, wherein;

FIG. 1 is a longitudinal sectional view of a coupling hook incorporating the present invention and showing the latch in the locked position; and, FIG. 2 is a view similar to that of FIG. 1 but showing the latch in the open or unlocked position.

Proceeding next to the drawings wherein like reference symbols indicate the same parts throughout the various views a specific embodiment of the present invention will be described in detail.

As may be seen in FIGS. 1 and 2 of the drawings, there is indicated generally at 10 a coupling hook according to the present invention which comprises a hook portion 11 in which is formed a pocket 12 having a hook opening 13 within which is received a coupling pin 14 from an implement to be coupled. Upper surfaces 15 and 15a are formed on both sides of the hook opening 13.

Seated within the pocket 12 is a semi-spherical member 16 having a projection 17 thereon which is received within a sliding groove 18 to guide the element 16 therein. A bore 19 is formed in the lower surface of the pocket 12 and within the bore 19 is a ball 20 urged upwardly by a spring 21. The partial spherical element 16 is provided with a slot 22 to receive the coupling pin 14.

Within the hook 11 there is formed a through bore 23 having one end 24 opening into the hook opening 13 and the other end 25 opening on the lower outer surface of the hook. Within the bore 23 there is slidably mounted a latch bolt 26 one end 27 of which extends into the hook opening 13 when the latch is in its locked position as shown in FIG. 1. The underside of the latch bolt 26 is provided with an abutment surface 28 and a latching surface 29.

Within the bore 23 there is positioned a locking bolt 30 having one end thereof pivotally connected to the latch bolt 26 by a pin 31. The other end of the locking bolt 30 extends outwardly of the bore 23. A spring 32 is positioned about that portion of the locking bolt 30 in the lower portion of bore 23 and one end of the spring 32 rests upon a surface 33 upon a disc 34 which has an opening 35 therein and which closes the lower end 25 of the bore 23. The locking bolt 30 extends outwardly through the opening 35. The other end of the spring 32 rests upon a disc 36 which is inclined at an angle with respect to the center longitudinal axis of the bore 23 and of the corresponding longitudinal axis of the locking bolt 30. A pin 37 is provided to support one side of the disc 36 so that the disc is tilted at an angle as shown in the drawings.

The lower end of the locking bolt 30 is provided with a locking surface 38 and an abutment surface 39 which are engageable with the edge of the disc opening 35. The lower end of the locking bolt 30 is threaded at 40 and a transition member 41 is threaded thereon. A handle or operating element 42 is attached upon the transition element 41 by means of a clamping band or ring 43.

When a three-point implement, machine or other form of apparatus is to be coupled to the three-point hitch of the tractor, the tractor operator will back the tractor toward the implement in order to couple the two lower implement coupling pins with the coupling hooks of the lower guide members. The upper guide member is then positioned on the upper coupling pin 14 which may slide over either sliding surface 15 or 15a into the pocket 22. This positioning of coupling pin 14 can be effected by lifting or lowering of the implement.

As the coupling pin 14 drops into the pocket 22 the semi-spherical member 16 will pivot downwardly by virtue of its projection 17 received within the groove 18. This downward pivoting of the element 16 into the pocket 12 of the hook will push the ball 20 downwardly and compress the spring 21. At the same time, abutment surface 16a of the element 16 will be pulled away from the latch catch 29 and abutment surface 28 because of the turning movement of the element 16. The latch bolt 26, loaded by the force exerted by locking spring 32, is then released and moved outwardly into the locking position as shown in FIG. 1. The latch bolt 26 is now positioned over the coupling pin 14 and the coupling hook 10 is now in its locked state.

During this locking movement, the locking bolt 30 is withdrawn into the bore 23 a sufficient distance such that its locking surface 38 engages and abuts against an edge of the opening 35 in the closing disc 34. This lateral pivoting movement of the locking bolt 30 is effected by the spring 32 acting in a direction to intersect the longitudinal axis of the locking bolt 30. The oblique or angular arrangement of the disc 36 subjects the locking spring 32 to a non-uniform load and the tendency of the spring is to equalize the load. The other or lower end of the spring 32 is shifted during this locking movement so that this end is eccentrically positioned on the closing disc 34. The stronger loaded portion of spring 32 simultaneously exerts a torque on the locking bolt 30 through the holding pin 37 and pivot pin 31. However, such a torque can become effective only after the latch bolt 26 has been unlocked by the action of the coupling pin 14 being received within the pocket 22. The locking bolt 30 is thus retracted sufficiently far into the bore 23 that the locking surface 38 permits a pivoting or lateral displacement of the locking bolt 30 around its pin 31 and the locking bolt is thus fixed against axial movement.

The latch bolt 26 and the locking bolt 30 can no longer be shifted axially without a release of the locking engagement brought about by an intentional and deliberate movement. Unlocking must be achieved by a pre-selected or determined direction of operation to enable the locking bolt 30 and the latch bolt 26 pivotally connected thereto to be operated against the force of the locking spring 32 and thus release the coupling pin 14. The element 16 will then be moved upwardly under the action of the spring 21 and ball 20 such that the abutment surface 16a will engage the latch bolt surfaces 29 and 28 to secure the latch bolt 26 in the release position so as to permit a coupling operation.

It is thus apparent that the eccentric or off-center position of the locked locking bolt 30 requires a movement in a particular direction by the operating handle 42 to unlock the locking bolt 30 before the coupling pin 14 can be unlocked by an axial or longitudinal withdrawal of the latch bolt 26. With the coupling hook of the present invention is it thus not possible to unintentionally unlock the coupling hook by a simple pulling of the operating lever. The necessity for actuating the operating handle 42 in a particular direction to first unlock the locking bolt before the latch bolt can release the coupling pin is somewhat analogous to the reverse gear lock of the transmission in a motor vehicle. In order to shift the transmission into reverse a certain and deliberate movement is required. In the same manner, a particular and deliberate movement is required in order to permit uncoupling of the coupling hook disclosed.

It will be understood that this invention is susceptible to modification in order to adapt it to different usages and conditions, and accordingly, it is desired to comprehend such modifications within this invention as may fall within the scope of appended claims.

What is claimed is:

1. A coupling hook for a guide member of a three-point attachment of a tractor comprising a hook member having an opening to receive a coupling pin on an implement to be coupled, there being a bore in said hook member opening into said hook opening, a latch bolt within said bore and displaceable into said hook opening in the locked position, a locking bolt in said bore pivotally connected to said latch bolt and having a locking surface thereon, spring means acting upon said locking bolt in a direction intersecting the axis of said locking bolt, and abutment means engageable by said locking surface under the action of said spring to retain said latch bolt in the locked position.

2. A coupling hook as claimed in claim 1 wherein said latch bolt is displaceable from one end of said bore, a disc having an opening therein in the other end of said bore, said locking bolt extending outwardly through said disc opening.

3. A coupling hook as claimed in claim 2 wherein said disc comprises said abutment means.

4. A coupling hook as claimed in claim 2 wherein said spring means surrounds said locking bolt and one end thereof bears against said disc.

5. A coupling hook as claimed in claim 1 and a second disc on said locking bolt inclined to the axis of said bore, the other end of said spring means bearing against said second disc.

6. A coupling hook as claimed in claim 1 wherein one end of said latch bolt extends into said hook opening and said locking bolt is pivotally connected to the other end of said latch bolt.

7. A coupling hook as claimed in claim 6 wherein said one end of said latch bolt is displaceable from one end of said bore, a first disc having an opening therein in the other end of said bore and said abutment means being on said disc, said locking bolt extending outwardly through said disc opening, a second disc on said locking bolt and inclined to the axis of said bore, said spring means surrounding said locking bolt and having one end bearing against said first disc and the other end bearing against said second disc.

* * * * *